United States Patent [19]

Hatanaka

[11] Patent Number: 5,663,271
[45] Date of Patent: Sep. 2, 1997

[54] POLYSILANES AND METHOD FOR PRODUCING THE SAME

[76] Inventor: Yasuo Hatanaka, 1-9-2, Minamidai, Sagamihara-shi, Kanagawa-ken, Japan

[21] Appl. No.: 552,458

[22] Filed: Nov. 9, 1995

Related U.S. Application Data

[63] Continuation of Ser. No. 208,666, Mar. 11, 1994, abandoned.

[30] Foreign Application Priority Data

| Mar. 12, 1993 | [JP] | Japan | 5-052497 |
| Feb. 22, 1994 | [JP] | Japan | 6-024429 |

[51] Int. Cl.$^6$ .................................................. C08G 77/04
[52] U.S. Cl. ........................... 528/37; 528/10; 528/30; 528/33; 556/430
[58] Field of Search ........................... 556/430; 528/37, 528/10, 33, 30

[56] References Cited

U.S. PATENT DOCUMENTS

| 3,146,249 | 8/1964 | Alsgaard et al. | 556/430 |
| 4,783,516 | 11/1988 | Schilling, Jr. et al. | 528/14 |
| 5,214,176 | 5/1993 | Soula et al. | 556/430 |

FOREIGN PATENT DOCUMENTS

| 0502662 | 9/1992 | European Pat. Off. . |
| 2224857 | 5/1990 | United Kingdom . |

OTHER PUBLICATIONS

M. Cypryk, et al., Journal of the American Chemical Society, vol. 113, 1991, pp. 1046–1047.

Y. Gupta, et al., American Chemical Society, No. 31, 1990, pp. 46–47.

Billmeyer, Jr. Textbook of Polymer Sciences, John Wiley & Sons, Inc., 1971, pp. 5 and 6.

Encyclopedia of Polymer Science and Engineering, vol. 15, p. 481, John Wiley & Sons, NY, 1989.

*Primary Examiner*—Melvyn I. Marquis
*Attorney, Agent, or Firm*—Sherman and Shalloway

[57] ABSTRACT

A polysilane of Formula [I] or [II]:

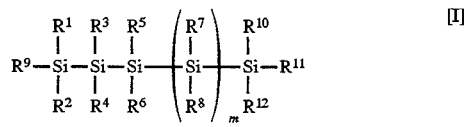

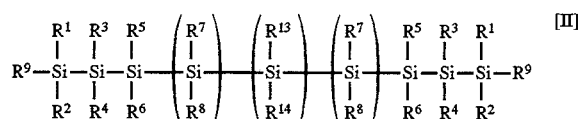

(wherein $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ denote independently hydrogen, alkyl, aryl, alkenyl, alkynyl, silyl, and amino groups. $R^1$ and $R^2$, $R^3$ and $R^4$, $R^5$ and $R^6$, $R^7$ and $R^8$, $R^{13}$ and $R^{14}$, $R^{10}$ and $R^{11}$ can form a ring with the silicon bonded to each group. m is 0 or 1. n is an integer.);

and a method for synthesizing the polysilane of Formula [I] or [II] in which a small-ring polysilane is reacted (in a solvent) with an organolithium reagent, and then treated with silanes possessing a leaving group. The resulting polysilanes have a homogeneous molecular weight distribution and are useful as a functional polymer for nonlinear optical materials and electroconductive polymers.

17 Claims, No Drawings

POLYSILANES AND METHOD FOR PRODUCING THE SAME

This application is a continuation of application Ser. No. 08/208,666, filed Mar. 11, 1994, now abandoned.

FIELD OF THE INVENTION

This invention relates to polysilanes which are useful as functional polymers such as nonlinear optical materials or electroconductive polymers, and to a method for synthesizing the same.

DESCRIPTION OF PRIOR ART

Polysilanes are known to be useful as functional polymers such as nonlinear optical materials or electroconductive polymers ["Synthesis and Application of Organic Silicon Polymers" JMC (1989); Report of the National Chemical Laboratory for Industry, 8, 569 (1989); J. Chem. Rev. 89, 1359 (1989)].

Synthetic methods of polysilanes of Formula [I] include:
(1) polycondensation of dichlorosilanes with an alkali metal such as sodium [J. Chem. Rev. 89, 1359 (1989)],
(2) dehydrogenative coupling of polyhydrosilanes catalyzed by a transition metal complex [Can. J. Chem., 65, 1804 (1987); J. Organomet. Chem., 27, C31 (1971)],
(3) anion polymerization of disilabicyclooctadiene which is an equivalent of disilene [J. Am. Chem. Soc., 111, 7641 (1989)],
(4) electrochemical polymerization of dichlorodiorganosilanes [J. Chem. Soc., Chem. Commun., 1160 (1990)], and
(5) ring-opening polymerization of cyclotetrasilanes with a catalytic amount of butyllithium [J. Am. Chem. Soc., 113, 1046 (1991)].

Of these methods, the methods (1) and (4) have problems in that the functional group which can be introduced is limited, and the molecular weight distribution is dispersed.

The method (2) has problems in that the substrates are limited to a monosubstituted silanes, and the molecular weight distribution is dispersed.

The method (3) has a problem in that the disilene equivalent used as a starting material is difficult to be synthesized.

In the method (5), usable substrate is structurally limited.

Physical properties of a polysilane are affected by the molecular weight distribution and the sequence order of substituents on the main chain. Therefore, to obtain a polysilane which has uniform electrical or optical properties, it is necessary to synthesize a polysilane which has homogeneous molecular distribution. Further, in order to achieve desired functions, it is preferable that the substituent arrangement order can be controlled.

OBJECT OF THE INVENTION

The inventors have conducted intensive studies on a polysilane which has homogeneous molecular weight and has various functional groups and an industrially applicable synthetic method. As a result, it has been found that a polysilane having a completely homogeneous molecular weight can be synthesized by reacting a small-ring polysilane with an organolithium reagent, followed by treating with organosilanes bearing a leaving group, thus accomplishing the present invention. A primary object of the present invention is to provide a polysilane having homogeneous molecular weights and a controlled substituent pattern, and a novel and highly selective synthetic method thereof.

SUMMARY OF THE INVENTION

In accordance with the present invention, there is provided a polysilane of Formula [I]:

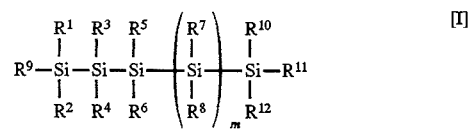

(wherein $R^1$, $R^2$, $R^3$, $R^4$, $R^5$, $R^6$, $R^7$, $R^8$, $R^9$, $R^{10}$, $R^{11}$ and $R^{12}$ denote independently hydrogen, alkyl, aryl, alkenyl, alkynyl, silyl, and amino groups. $R^1$ and $R^2$, $R^3$ and $R^4$, $R^5$ and $R^6$, $R^7$ and $R^8$, $R^{10}$ and $R^{11}$ can form a ring with the silicon bonded to each group. m is 0 or 1.).

There is also provided according to the present invention a method for producing the polysilane of Formula [I]:

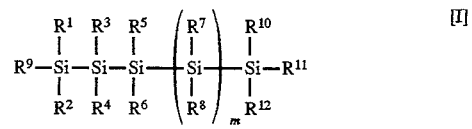

(wherein $R^1$, $R^2$, $R^3$, $R^4$, $R^5$, $R^6$, $R^7$, $R^8$, $R^9$, $R^{10}$, $R^{11}$ and $R^{12}$ denote independently hydrogen, alkyl, aryl, alkenyl, alkynyl, silyl, and amino groups. $R^1$ and $R^2$, $R^3$ and $R^4$, $R^5$ and $R^6$, $R^7$ and $R^8$, $R^{10}$ and $R^{11}$ can form a ring with the silicon bonded to each group. m is 0 or 1.), characterized in that a small-ring polysilane of Formula [III]:

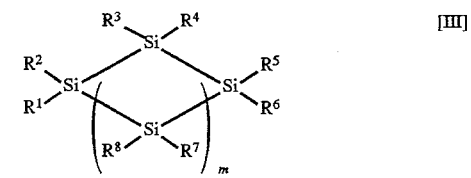

(wherein $R^1$, $R^2$, $R^3$, $R^4$, $R^5$, $R^6$, $R^7$ and $R^8$ denote independently hydrogen, alkyl, aryl, alkenyl, alkynyl, silyl, and amino groups. $R^1$ and $R^2$, $R^3$ and $R^4$, $R^5$ and $R^6$, $R^7$ and $R^8$ can form a ring with the silicon bonded to each group. m is 0 or 1.) is reacted in a solvent with an organolithium reagent of Formula [IV]:

(wherein $R^9$ denotes alkyl, aryl, alkenyl, alkynyl, or silyl groups.), and then treated with silanes of Formula [V]:

(wherein $R^{10}$, $R^{11}$ and $R^{12}$ denote independently hydrogen, alkyl, aryl, alkenyl, alkynyl, silyl, and amino groups. $R^{10}$ and $R^{11}$ can form a ring with the silicon bonded to each group. X denotes a leaving group.).

There is further provided according to the present invention a polysilane of Formula [II]:

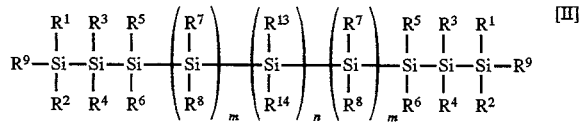

(wherein $R^1$, $R^2$, $R^3$, $R^4$, $R^5$, $R^6$, $R^7$, $R^8$, $R^9$, $R^{13}$ and $R^{14}$, denote independently hydrogen, alkyl, aryl, alkenyl, alkynyl, silyl, and amino groups. $R^1$ and $R^2$, $R^3$ and $R^4$, R⁵ and R⁶, R⁷ and R⁸, R¹³ and R¹⁴ can form a ring with the silicon bonded to each group. m is 0 or 1. n is an integer.).

There is further provided according to the present invention a method for producing the polysilane of Formula [II]:

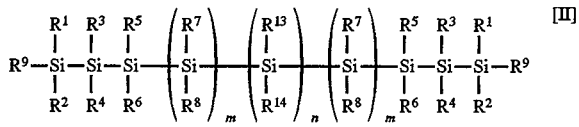

(wherein R¹, R², R³, R⁴, R⁵, R⁶, R⁷, R⁸, R⁹, R¹³ and R¹⁴ denote independently hydrogen, alkyl, aryl, alkenyl, alkynyl, silyl, and amino groups. R¹ and R², R³ and R⁴, R⁵ and R⁶, R⁷ and R⁸, R¹³ and R¹⁴ can form a ring with the silicon bonded to each group. m is 0 or 1. n is an integer.)
characterized in that a small-ring polysilane of Formula [III]:

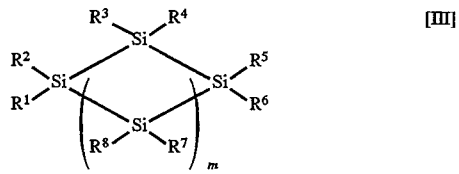

(wherein R¹, R², R³, R⁴, R⁵, R⁶, R⁷ and R⁸ denote independently hydrogen, alkyl, aryl, alkenyl, alkynyl, silyl, and amino groups. R¹ and R², R³ and R⁴, R⁵ and R⁶, R⁷ and R⁸ can form a ring with the silicon bonded to each group. m is 0 or 1.)
is reacted in a solvent with an organolithium reagent of Formula [IV]:

(wherein R⁹ denotes alkyl, aryl, alkenyl, alkynyl, silyl, or amino groups.),
and then with silanes of Formula [VII]:

(wherein R¹³ and R¹⁴ denote independently hydrogen, alkyl, aryl, alkenyl, alkynyl, silyl, and amino groups. R¹³ and R¹⁴ can form a ring with the silicon bonded to each group. n is an integer. X denotes a leaving group.).

In the above Formulae, the alkyl groups can be methyl, ethyl, propyl, butyl, pentyl, hexyl, cyclohexyl, isobutyl, isopropyl, benzyl, or the like. The aryl groups can be phenyl, thienyl, pyridyl, naphthyl, or furyl. The alkenyl groups can be ethenyl, propenyl, butenyl, pentenyl, hexenyl, cyclohexenyl, or cyclopentenyl. The alkynyl groups can be ethynyl, propynyl, butynyl, pentynyl, or hexynyl. The silyl groups can be trimethylsilyl, triethylsilyl, tripropylsilyl, tributylsilyl, tripentylsilyl, trihexylsilyl, triphenylsilyl, phenyldimethylsilyl, or diphenylmethylsilyl. The amino groups can be dimethylamino or diethylamino. These alkyl, aryl, alkenyl, alkynyl, and silyl groups may have substituents, and the substituents can be aryl, trifluoromethyl, nitro, cyano, alkoxy, acyl, halogen, or the like.

The small-ring polysilane of Formula [III] used in the present invention can be easily prepared by a method in which dichlorodiorganosilanes are condensed by lithium or sodium [J. Chem. Soc, Chem. Commun., 781 (1983); Organometallics, 3, 141 (1984); Chem. Lett., 1711 (1983); J. Organomet. Chem., 212, 155 (1981); Polym. Prepr. 31, 46 (1990); Organometallics, 2, 1771 (1983).

The small-ring polysilane of Formula [III] includes, for example, hexapropylcyclotrisilane, hexa(2,2-dimethylpropyl)cyclotrisilane, hexa(1,1-dimethylethyl)cyclotrisilane, hexamesitylcyclotrisilane, octa(trimethylsilyl)cyclotetrasilane, octaethylcyclotetrasilane, octa(isopropyl)cyclotetrasilane, octaphenylcyclotetrasilane, 1,2,3,4-tetramethyl-1,2,3,4-tetraphenylsilane, 1,2,3,4-tetrabromo-1,2,3,4-tetraphenylcyclotetrasilane, 1,2,3,4-tetramethoxy-1,2,3,4-tetraphenylcyclotetrasilane, 1,2,3,4-tetraphenylcyclotetrasilane, 1,2,3,4-tetravinyl-1,2,3,4-tetraphenylcyclotetrasilane, 1,2,3,4-tetraethylcyclotetrasilane, and 1,2,3,4-tetraphenylcyclotetrasilane.

The organolithium reagents of Formula [IV] can be silyllithium compounds such as phenyldimethylsilyllithium, diphenylmethylsilyllithium, triphenylsilyllithium, trimethylsilyllithium, 4-(dimethylamino)phenyl(dimethyl)silyllithium, 4-(diethylamino)phenyl(dimethyl)silyllithium, and diethylamino(dimethyl)silyllithium, and lithium reagents such as butyllithium, phenyllithium, and methyllithium.

Of the silanes of Formula [V] used in the present invention, those which have halogen as a leaving group are industrially available, and those which have perfluoroalkanesulfonyloxy, fluorosulfonyloxy alkanesulfonyloxy, or arenesulfonyloxy as a leaving group can be easily prepared by treating the corresponding phenylsilanes with various sulfonic acids [see Examples]. In addition to the above, the leaving group includes acetoxy, trifluoroacetoxy, cyano, and the like.

The alkyl groups of the silanes of Formula [V] can be, for example, methyl, ethyl, propyl, butyl, pentyl, hexyl, cyclohexyl, isobutyl, isopropyl, or benzyl. The aryl groups can be phenyl, thienyl, pyridyl, naphthyl, or furyl. The alkenyl groups can be ethenyl, propenyl, butenyl, pentenyl, hexenyl, cyclohexenyl, or cyclopentenyl. The alkynyl groups can be ethynyl, propynyl, butynyl, pentynyl, or hexynyl. The silyl groups can be trimethylsilyl, triethylsilyl, tripropylsilyl, tributylsilyl, tripentylsilyl, trihexylsilyl, triphenylsilyl, phenyldimethylsilyl, or diphenylmethylsilyl. The amino groups can be dimethylamino or diethylamino. These alkyl, aryl, alkenyl, alkynyl, and silyl groups may have substituents, and the substituents can be aryl, trifluoromethyl, nitro, cyano, alkoxy, acyl, halogen, or the like. The leaving group can be halogen such as chlorine, bromine, fluorine, and iodine; and perfluoroalkanesulfonyloxy, alkanesulfonyloxy, fluorosulfonyloxy, and arenesulfonyloxy.

Of the silanes of Formula [VI] used in the present invention, those which have halogen as a leaving group can be easily prepared by ring-opening halogenation of small-ring polysilanes [Organometallics, 2, 1806 (1983)]. Further, those which have, perfluoroalkanesulfonyloxy, fluorosulfonyloxy, alkanesulfonyloxy, or arenesulfonyloxy as a leaving group can be easily prepared by treating the corresponding diphenylsilanes with various sulfonic acids [see Examples].

The alkyl groups of the silanes of Formula [VII] can be, for example, methyl, ethyl, propyl, butyl, pentyl, hexyl, cyclohexyl, isobutyl, isopropyl, or benzyl. The aryl groups can be phenyl, thienyl, pyridyl, naphthyl, or furyl. The alkenyl groups can be ethenyl, propenyl, butenyl, pentenyl, hexenyl, cyclohexenyl, or cyclopentenyl. The alkynyl groups can be ethynyl, propynyl, butynyl, pentynyl, or hexynyl. The sibyl groups can be trimethylsilyl, triethylsilyl, tripropylsilyl, tributylsilyl, tripentylsilyl, trihexylsilyl, triphenylsilyl, phenyldimethylsilyl, or diphenylmethylsilyl. The amino groups can be dimethylamino or diethylamino. These alkyl, aryl, alkenyl, alkynyl, arid silyl groups may have substituents, and the substituents can be aryl, trifluoromethyl, nitro, cyano, acyl, alkoxy, halogen, or the like. The leaving group can be halogen such as chlorine, bromine, fluorine, and iodine; and perfluoroalkanesulfonyloxy, alkanesulfonyloxy, fluorosulfonyloxy, and arenesulfonyloxy.

In carrying out the production method of the present invention, it is preferable to use a solvent, and the solvent can be ether solvents such as tetrahydrofuran, diethylether, dioxane, dimethoxymethane, and the like; amide solvents such as hexamethylphosphotriamide, dimethylformamide, formamide, N,N-dimethylpyrrolidone, and the like; and hydrocarbon solvents such as hexane, pentane, benzene, toluene, and the like. The reaction can be carried out in the range from −78° C. to 30° C., but it is preferable to carry out the reaction at room temperature to −78° C. in view of the reaction efficiency.

DETAILED DESCRIPTION OF PREFERRED EMBODIMENTS

The present invention will be described further in detail with reference to the examples.

EXAMPLE 1

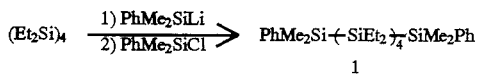

1

In an argon atmosphere; to a tetrahydrofuran solution (1 ml) of 52 mg (0.15 mmol) of octaethylcyclotetrasilane was added 0.56 ml (0.15 mmol) of a tetrahydrofuran solution (0.27M) of phenyldimethylsilyllithium, and stirred at 0° C. for 15 minutes. Phenyldimethylchlorosilane in an amount of 26 mg (0.15 mmol) was added, and reacted at room temperature for 3 hours. Hexane (2 ml) and saturated aqueous sodium bicarbonate solution (2 ml) were added, stirred, the hexane layer was separated, and dried with magnesium sulfate. The resulting crude product was purified by a silica gel column chromatography (hexane) to give 42 mg (46% yield) of 2,2,3,3,4,4,5,5-octaethyl-1,1,6,6-tetramethyl-1,6-diphenylhexasilane (1).

2,2,3,3,4,4,5,5-Octaethyl-1,1,6,6-tetramethyl-1,6-diphenylhexasilane (1)

$^1$H NMR (CDCl$_3$): δ0.45 (S, 12H), 0.60–1.80 (m, 40H), 7.20–7.80 (m, 10H)

IR (KBr): 3050, 2950, 1240, 1100, 1005, 830, 804, 728, 695 cm$^{-1}$

UV (cyclohexane) $\lambda_{MAX}$ 225 nm (ε11300)

EXAMPLE 2

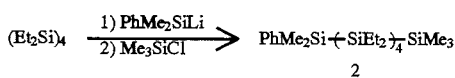

2

In an argon atmosphere, to a tetrahydrofuran solution (1 ml) of 52 mg (0.15 mmol) of octaethylcyclotetrasilane was added 0.56 ml (0.15 mmol) of a tetrahydrofuran solution (0.27M) of phenyldimethylsilyllithium, and stirred at 0° C. for 15 minutes. Trimethylchlorosilane in an amount of 108 mg (1.0 mmol) was added, and reacted at room temperature for 3 hours. Hexane (2 ml) and saturated aqueous sodium bicarbonate solution (2 ml) were added, stirred, the hexane layer was separated, and dried with magnesium sulfate. The resulting crude product was purified by a silica gel column chromatography (hexane) to give 39 mg (47% yield) of 2,2,3,3,4,4,5,5-octaethyl-1,1,6,6,6-pentamethyl-1-phenylhexasilane (2).

2,2,3,3,4,4,5,5-Octaethyl-1,1,6,6,6-pentamethyl-1-phenylhexasilane (2)

$^1$H NMR (CDCl$_3$): δ0.16 (S, 9H), 0.47 (S, 6H), 0.55–1.25 (m, 40H), 7.25–7.63 (m, 10H)

IR (KBr): 3100, 2970, 1245, 830, 810, 735, 700 cm$^{-1}$

UV (cyclohexane) $\lambda_{MAX}$ 237 nm (ε15600)

EXAMPLE 3

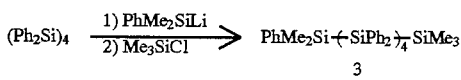

3

In an argon atmosphere, to a tetrahydrofuran solution (9 ml) of 109 mg (0.15 mmol) of octaphenylcyclotetrasilane was added 0.56 ml (0.15 mmol) of a tetrahydrofuran solution (0.27M) of phenyldimethylsilyllithium, and stirred at 0° C. for 15 minutes. Trimethylchlorosilane in an amount of 108 mg (1.0 mmol) was added, and reacted at room temperature for 3 hours. Hexane (2 ml) and saturated aqueous sodium bicarbonate solution (2 ml) were added, stirred, the hexane layer was separated, and dried with magnesium sulfate. The resulting crude product was purified by a silica gel column chromatography (hexane) to give 45 mg (32% yield) of 1,1,6,6,6-pentamethyl-1,2,2,3,3,4,4,5,5-nonaphenylhexasilane (3).

1,1,6,6,6-Pentamethyl-1,2,2,3,3,4,4,5,5-nonaphenylhexasilane (3)

$^1$H NMR (CDCl$_3$): δ0.15 (S, 9H), 0.30 (S, 6H), 6.90–7.80 (m, 45H)

IR (KBr): 3060, 2950, 1425, 1140, 835, 808, 760, 695, 470 cm$^{-1}$

UV (cyclohexane) $\lambda_{MAX}$ 245 nm (ε14300)

EXAMPLE 4

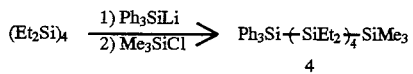

4

In an argon atmosphere, to a tetrahydrofuran solution (1 ml) of 52 mg (0.15 mmol) of octaethylcyclotetrasilane was added 0.75 ml (0.15 mmol) of a tetrahydrofuran solution (0.20M) of triphenylsilyllithium, and stirred at 0° C. for 15 minutes. Trimethylchlorosilane in an amount of 108 mg (1.0 mmol) was added, and reacted at room temperature for 3 hours. Hexane (2 ml) and saturated aqueous sodium bicarbonate solution (2 ml) were added, stirred, the hexane layer was separated, and dried with magnesium sulfate. The resulting crude product was purified by a silica gel column chromatography (hexane) to give 42 mg (41% yield) of 2,2,3,3,4,4,5,5-octaethyl-1,1,1-trimethyl-6,6,6-triphenylhexasilane (4).

2,2,3,3,4,4,5,5-Octaethyl-1,1,1-trimethyl-6,6,6-triphenylhexasilane (4)

$^1$H NMR (CDCl$_3$): δ0.15 (S, 9H), 0.75–2.25 (m, 40H), 6.95–7.70 (m, 15H)

IR (KBr): 3050, 2940, 1240, 1100, 1005, 804, 750, 735, 690 cm$^{-1}$

UV (cyclohexane) $\lambda_{MAX}$ 228 nm ($\epsilon$14700)

EXAMPLE 5

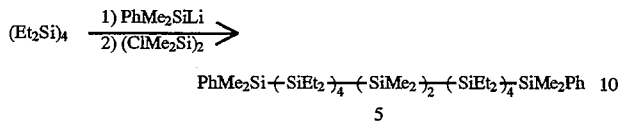

PhMe$_2$Si$-$(SiEt$_2$)$_4-$(SiMe$_2$)$_2-$(SiEt$_2$)$_4-$SiMe$_2$Ph    5

In an argon atmosphere, to a tetrahydrofuran solution (1 ml) of 52 mg (0.15 mmol) of octaethylcyclotetrasilane was added 0.58 ml (0.15 mmol) of a tetrahydrofuran solution (0.27M) of phenyldimethylsilyllithium, and stirred at 0° C. for 15 minutes. 1,2-Dichloro-1,1,2,2-tetramethyldisilane in an amount of 19 mg (0.11 mmol) was added, and reacted at room temperature for 3 hours. Hexane (2 ml) and saturated aqueous sodium bicarbonate solution (2 ml) were added, stirred, the hexane layer was separated, and dried with magnesium sulfate. The resulting crude product was purified by a silica gel column chromatography (hexane) to give 24 mg (15% yield) of 2,2,3,3,4,4,5,5,8,8,9,9,10,10,11,11-hexadecaethyl-1,1,6,6,7,7,12,12-octamethyl-1,12-diphenyldodecasilane (5) as a colorless crystal.

2,2,3,3,4,4,5,5,8,8,9,9,10,10,11,11-Hexadecaethyl-1,1,6,6,7,7,12,12-octamethyl-1,12-diphenyldodecasilane (5)

$^1$H NMR (CDCl$_3$): δ0.26 (S, 12H), 0.43 (S, 12H), 0.60–2.20 (m, 80H), 7.20–7.80 (m, 10H)

IR (KBr): 3050, 2950, 1450, 1420, 1240, 1015, 830, 800, 765, 690, 670 cm$^{-1}$

UV (cyclohexane) $\lambda_{MAX}$ 285 nm ($\epsilon$43700)

EXAMPLE 6

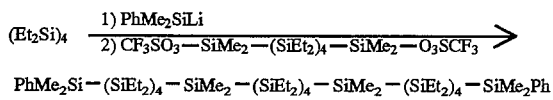

PhMe$_2$Si$-$(SiEt$_2$)$_4-$SiMe$_2-$(SiEt$_2$)$_4-$SiMe$_2-$(SiEt$_2$)$_4-$SiMe$_2$Ph

In an argon atmosphere, to a tetrahydrofuran solution (1 ml) of 68 mg (0.20 mmol) of octaethylcyclotetrasilane was added 0.72 ml (0.20 mmol) of a tetrahydrofuran solution (0.26M) of phenyldimethylsilyllithium, and stirred at 0° C. for 15 minutes. Then, tetrahydrofuran was distilled out under vacuum, and hexane (1 ml) was added to afford a hexane solution (Solution 1). A dichloromethane solution (1 ml) of 31 mg (0.05 mmol) of 2,2,3,3,4,4,5,5-octaethyl-1,1,6,6-tetramethyl-1,6-diphenylhexasilane (1) obtained in Example 1 was treated with 15 mg (0.10 mmol) of trifluoromethanesulfonic acid at room temperature for 30 minutes to give 1,6-bis(trifluoromethanesulfonyloxy) hexasilanes. Then, dichloromethane was distilled out under vacuum, and hexane (1 ml) was added to give a hexane solution (Solution 2). The Solution 1 was added to the Solution 2 at −78° C. and stirred for 15 minutes. Methanol (0.1 ml) and triethylamine (0.1 ml) were added, then saturated aqueous sodium bicarbonate solution (2 ml) was added, stirred, the hexane layer was separated, and dried with magnesium sulfate. The resulting crude product was purified by a silica gel column (hexane) chromatography to afford 43 mg (61% yield) of hexadecasilane (6).

Hexadecasilane (6)

$^1$H NMR (CDCl$_3$): δ0.35 (S, 12H), 0.47 (S, 12H), 0.60–1.40 (m, 120H), 7.30–7.63 (m, 10H)

IR (KBr): 3050, 2950, 1455, 1420, 1380, 1240, 1100, 1020, 830, 800, 670 cm$^{-1}$

EXAMPLE 7

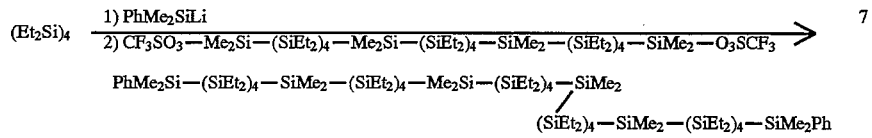

PhMe$_2$Si$-$(SiEt$_2$)$_4-$SiMe$_2-$(SiEt$_2$)$_4-$Me$_2$Si$-$(SiEt$_2$)$_4-$SiMe$_2$ (SiEt$_2$)$_4-$SiMe$_2-$(SiEt$_2$)$_4-$SiMe$_2$Ph

In an argon atmosphere, to a tetrahydrofuran solution (1 ml) of 68 mg (0.20 mmol) of octaethylcyclotetrasilane was added 0.72 ml (0.20 mmol) of a tetrahydrofuran solution (0.26M) of phenyldimethylsilyllithium, and stirred at 0° C. for 15 minutes. Then, tetrahydrofuran was distilled out under vacuum, and hexane (1 ml) was added to give a hexane solution (Solution 1). A dichloromethane solution (1 ml) of 71 mg (0.05 mmol) of hexadecasilane (6) obtained in Example 6 was treated with 15 mg (0.10 mmol) of trifluoromethanesulfonic acid at room temperature for 30 minutes to give 1,16-bis(trifluoromethanesulfonyloxy) hexadecasilane. Then, dichloromethane was distilled out under vacuum, and hexane (1 ml) was added to afford a hexane solution (Solution 2). The Solution 1 was added to the Solution 2 at −78° C., and stirred for 15 minutes. Methanol (0.1 ml) and triethylamine (0.1 ml) were added, then saturated aqueous sodium bicarbonate solution (2 ml) was added, stirred, the hexane layer was separated, and dried with magnesium sulfate. The resulting crude product was purified by a silica gel column (hexane) chromatography to give 46 mg (36% yield) of hexacosasilane (7) as a colorless crystal.

Hexacosasilane (7)

$^1$H NMR (CDCl$_3$): δ0.35 (S, 24H), 0.50 (S, 12H), 0.65–1.20 (m, 200H), 7.20–7.80 (m, 10H)

IR (KBr): 3050, 2950, 1450, 1420, 1240, 1015, 830, 800, 765, 690, 670 cm$^{-1}$

EXAMPLE 8

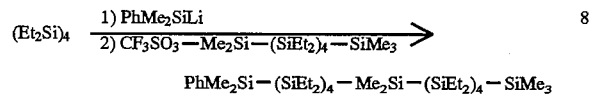

PhMe$_2$Si$-$(SiEt$_2$)$_4-$Me$_2$Si$-$(SiEt$_2$)$_4-$SiMe$_3$

In an argon atmosphere, to a tetrahydrofuran solution (1 ml) of 52 mg (0.15 mmol) of octaethylcyclotetrasilane was added 0.71 ml (0.10 mmol) of a tetrahydrofuran solution (0.14M) of phenyldimethylsilyllithium, and stirred at 0° C. for 15 minutes. Then, tetrahydrofuran was distilled out under vacuum, and hexane (1 ml) was added to give a hexane solution (Solution 1). A dichloromethane solution (1 ml) of 27 mg (0.05 mmol) of 2,2,3,3,4,4,5,5-octaethyl-1,1,6,6,6-pentamethyl-1-phenylhexasilane (2) obtained in Example 2 was treated with 7.5 mg (0.05 mmol) of trifluoromethanesulfonic acid at room temperature for 30 minutes to give 1-(trifluoromethanesulfonyloxy)hexasilane. Then, dichloromethane was distilled out under vacuum, and hexane (1 ml) was added to give a hexane solution (Solution 2). The Solution 1 was added to the Solution 2 at −78° C. and stirred for 15 minutes. Methanol (0.1 ml) and triethylamine (0.1 ml) were added, then saturated aqueous sodium bicarbonate solution (2 ml) was added, stirred, the hexane layer was separated, and dried with magnesium sulfate. The resulting crude product was purified by a silica gel column chromatography (hexane) to afford 41 mg (86% yield) of undecasilane (8) as a colorless crystal.

Undecasilane (8)

$^1$H NMR (CDCl$_3$): δ0.18 (S, 9H), 0.34 (S, 6H), 0.47 (S, 6H), 0.60–1.15 (m, 80H), 7.20–7.35 (m, 3H), 7.40–7.53 (m, 2H) IR (KBr): 3050, 2950, 1460, 1420, 1380, 1240, 1105, 1020, 830, 800, 690 cm$^{-1}$

EXAMPLE 9

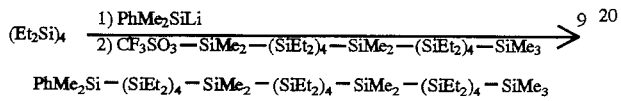

PhMe$_2$Si−(SiEt$_2$)$_4$−SiMe$_2$−(SiEt$_2$)$_4$−SiMe$_2$−(SiEt$_2$)$_4$−SiMe$_3$

In an argon atmosphere, to a tetrahydrofuran solution (1 ml) of 52 mg (0.15 mmol) of octaethylcyclotetrasilane was added 0.58 ml (0.15 mmol) of a tetrahydrofuran solution (0.27M) of phenyldimethylsilyllithium, and stirred at 0° C. for 15 minutes. Then, tetrahydrofuran was distilled out under vacuum, and hexane (1 ml) was added to give a hexane solution (Solution 1). A dichloromethane solution (1 ml) of 49 mg (0.05 mmol) of undecasilane (8) obtained in Example 8 was treated with 7.5 mg (0.05 mmol) of trifluoromethanesulfonic acid at room temperature for 30 minutes to afford 1-(trifluoromethanesulfonyloxy)undecasilane. Then, dichloromethane was distilled out under vacuum, and hexane (1 ml) was added to give a hexane solution (Solution 2). The Solution 1 was added to the Solution 2 at −78° C. and stirred for 15 minutes. Methanol (0.1 ml) and triethylamine (0.1 ml) were added, then saturated aqueous sodium bicarbonate solution (2 ml) was added, stirred, the hexane layer was separated, and dried with magnesium sulfate. The resulting crude product was purified by a silica gel column chromatography (hexane) to give 36 mg (41% yield) of hexadecasilane (9) as a colorless crystal.

Hexadecasilane (9)

$^1$H NMR (CDCl$_3$): δ0.18 (S, 9H), 0.34 (S, 12H), 0.47 (S, 6H), 0.60–1.50 (m, 120H), 7.22–7.35 (m, 3H), 7.40–7.55 (m, 2H)

IR (KBr): 3050, 2950, 1450, 1420, 1240, 1015, 830, 800, 765, 690, 670 cm$^{-1}$

EXAMPLE 10

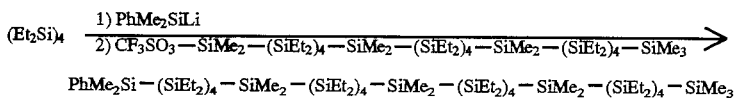

PhMe$_2$Si−(SiEt$_2$)$_4$−SiMe$_2$−(SiEt$_2$)$_4$−SiMe$_2$−(SiEt$_2$)$_4$−SiMe$_2$−(SiEt$_2$)$_4$−SiMe$_3$

In an argon atmosphere, to a tetrahydrofuran solution (1 ml) of 52 mg (0.15 mmol) of octaethylcyclotetrasilane was added 0.58 ml (0.15 mmol) of a tetrahydrofuran solution (0.27M) of phenyldimethylsilyllithium, and stirred at 0° C. for 15 minutes. Then, tetrahydrofuran was distilled out under vacuum, and hexane (1 ml) was added to give a hexane solution (Solution 1). A dichloromethane solution (1 ml) of 68 mg (0.05 mmol) of hexadecasilane (9) obtained in Example 9 was treated with 7.5 mg (0.05 mmol) of trifluoromethanesulfonic acid at room temperature for 30 minutes to give 1-(trifluoromethanesulfonyloxy)hexadecasilane. Then, dichloromethane was distilled out under vacuum, and hexane (1 ml) was added to give a hexane solution (solution 2). The Solution 1 was added to the Solution 2 at −78° C. and stirred for 15 minutes. Methanol (0.1 ml) and triethylamine (0.1 ml) were added, then saturated aqueous sodium bicarbonate solution (2 ml) was added, stirred, the hexane layer was separated, and dried with magnesium sulfate. The resulting crude product was purified by a silica gel column chromatography (hexane) to give 137 mg (39% yield) of eicosasilane (10) as a colorless crystal.

Eicosasilane (10)

$^1$H NMR (CDCl$_3$): δ0.20 (S, 9H), 0.37 (S, 18H), 0.51 (S, 6H), 0.60–1.80 (m, 160H), 720–7.60 (m, 10H)

IR (KBr): 3050, 2950, 1450, 1420, 1240, 1015, 830, 800, 765, 690, 670 cm$^{-1}$

As described above, the present invention provides a method for synthesizing a polysilane having a homogeneous molecular weight distribution and controlled substituent arrangement order using a simple procedure, which is useful as a functional polymer for nonlinear optical materials, electroconductive polymers, and the like.

What is claimed is:

1. A method for producing a polysilane compound of formula (I)

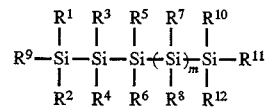

wherein $R^1$, $R^2$, $R^3$, $R^4$, $R^5$, $R^6$, $R^7$, $R^8$, $R^9$, $R^{10}$, $R^{11}$ and $R^{12}$ each, independently, represent hydrogen, alkyl, aryl, alkenyl, alkynyl, silyl, or amino group, and any of the pairs of $R^1$ and $R^2$, $R^3$ and $R^4$, $R^5$ and $R^6$, $R^7$ and $R^8$ or $R^{10}$ and $R^{11}$ can form a ring with the silicon atom to which the respective pair is bonded; and m is 0 or 1; which comprises reacting a small-ring polysilane of formula (III):

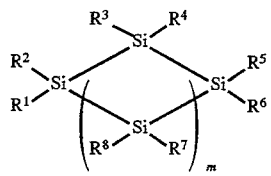

wherein $R^1$, $R^2$, $R^3$, $R^4$, $R^5$, $R^6$, $R^7$, $R^8$ and m have the same definitions as given for formula (I), with an organolithium reagent of formula (IV):

$$R^9\text{—Li} \quad (IV)$$

wherein $R^9$ represents alkyl, aryl, alkenyl, alkynyl or silyl group, in a solvent, and treating the product of said reaction with a silane of formula (v):

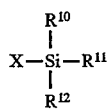

(V)

wherein $R^{10}$, $R^{11}$ and $R^{12}$ have the same definitions as given for formula (I), and X represents a leaving group, to thereby form the compound of formula (I).

2. A method for producing a polysilane compound of formula (II)

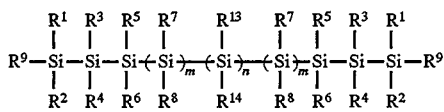

(II)

wherein $R^1$, $R^2$, $R^3$, $R^4$, $R^5$, $R^6$, $R^7$, $R^8$, $R^9$, $R^{13}$ and $R^{14}$ each, independently, represent hydrogen, alkyl, aryl, alkenyl, alkynyl, silyl or amino group, and any of the pairs of $R^1$ and $R^2$, $R^3$ and $R^4$, $R^5$ and $R^6$, $R^7$ and $R^8$ or $R^{13}$ and $R^{14}$ can form a ring with the silicon atom to which the respective pair is bonded; and m is 0 or 1 and n is a positive integer, which comprises reacting a small-ring polysilane of formula (III):

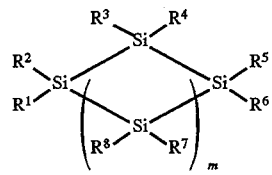

wherein $R^1$, $R^2$, $R^3$, $R^4$, $R^5$, $R^6$, $R^7$, $R^8$ and m have the same definitions as given for formula (II), with an organolithium reagent of formula (IV):

$$R^9-Li \qquad (IV)$$

wherein $R^9$ represents alkyl, aryl, alkenyl, alkynyl, silyl or amino group, in a solvent, and treating the product of said reaction with a silane of formula (VI):

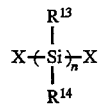

(VI)

wherein $R^{13}$ and $R^{14}$ have the same definitions as given for formula (II), and each X represents a leaving group, to thereby form the compound of formula (II).

3. A polysilane compound which is selected from the group consisting of $PhMe_2Si$—$(SiEt_2)_4$-$SiMe_2Ph$, $PhMe_2Si$—$(SiEt_2)_4$—$SiMe_3$, $PhMe_2Si$—$(SiPh_2)_4$—$SiMe_3$, and $Ph_3Si$—$(SiEt_2)_4$—$SiMe_3$, wherein Ph represents phenyl, Me represents methyl and Et represents ethyl.

4. A polysilane compound which is selected from the group consisting of $PhMe_2Si$—$(SiEt_2)_4$—$(SiMe_2)_2$—$(SiEt_2)_4$—$SiMe_2Ph$, $PhMe_2Si$—$(SiEt_2)_4$—$SiMe_2$—$(SiEt_2)_4$—$SiMe_2$—$(SiEt_2)_4$—$SiMe_2Ph$, $PhMe_2Si$—$(SiEt_2)_4$—$SiMe_2$—$(SiEt_2)_4$—$Me_2Si$—$(SiEt_2)_4$—$SiMe_2$—$(SiEt_2)_4$—$SiMe_2Ph$, $Ph_2Me_2Si$—$(SiEt_2)_4$—$Me_2Si$—$(SiEt_2)_4$—$SiMe_3$, $PhMe_2Si$—$(SiEt_2)_4$—$SiMe_2$—$(SiEt_2)_4$—$SiMe_2$—$(SiEt_2)_4$—$SiMe_3$, and $PhMe_2Si$—$(SiEt_2)_4$—$SiMe_2$—$(SiEt_2)_4$—$SiMe_2$—$(SiEt_2)_4$—$SiMe_2$—$(SiEt_2)_4$—$SiMe_3$, wherein Ph represents phenyl, Me represents methyl and Et represents ethyl.

5. The process of claim 1 wherein the reactions between the small-ring polysilane of formula (III) and the organolithium reagent of formula (IV) and between the product of said reaction and the silane of formula (V) are each carried out in a solvent selected from the group consisting of ether solvents, amide solvents and hydrocarbon solvents, at a temperature of from −78° C. to room temperature.

6. The process of claim 2 wherein the reactions between the small-ring polysilane of formula (III) and the organolithium reagent of formula (IV) and between the product of said reaction and the silane of formula (VI) are each carried out in a solvent selected from the group consisting of ether solvents, amide solvents and hydrocarbon solvents, at a temperature of from −78° C. to room temperature.

7. A compound of formula (I):

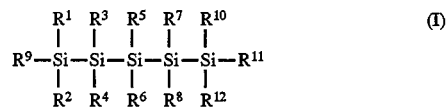

(I)

wherein $R^1$, $R^2$, $R^3$, $R^4$, $R^5$, $R^6$, $R^7$, $R^8$, $R^9$, $R^{10}$, $R^{11}$ and $R^{12}$ each, independently, represent hydrogen, alkyl, aryl, alkenyl, alkynyl, silyl or amino group, with the proviso that $R^1$, $R^2$, $R^3$, $R^4$, $R^5$, $R^6$, $R^7$, $R^8$, $R^9$, $R^{10}$, $R^{11}$ and $R^{12}$ are not simultaneously methyl groups, and wherein any of pairs $R^1$ and $R^2$, $R^3$ and $R^4$, $R^5$ and $R^6$, $R^7$ and $R^8$ or $R^{10}$ and $R^{11}$ can form a ring with the silicon atom to which the respective pair is bonded.

8. A compound of formula (I-1)

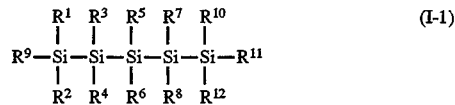

(I-1)

wherein $R^1$, $R^2$, $R^3$, $R^4$, $R^5$, $R^6$, $R^9$, $R^{10}$, $R^{11}$ and $R^{12}$ each, independently, represent hydrogen, alkyl, aryl, alkenyl, alkynyl, silyl or amino group, with the proviso that $R^1$, $R^2$, $R^3$, $R^4$, $R^5$, $R^6$, $R^{10}$ and $R^{12}$ are not simultaneously methyl group, and any of pairs $R^1$ and $R^2$, $R^3$ and $R^4$, $R^5$ and $R^6$ or $R^{10}$ and $R^{12}$ can form a ring with the silicon atom to which the respective pair is bonded.

9. A compound of formula (II):

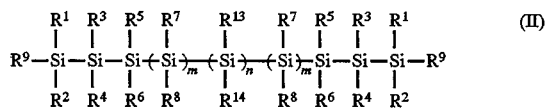

(II)

wherein $R^1$, $R^2$, $R^3$, $R^4$, $R^5$, $R^6$, $R^7$, $R^8$, $R^9$, $R^{13}$ and $R^{14}$ each, independently, represent hydrogen, alkyl, aryl, alkenyl, alkynyl, silyl or amino group, with the proviso that $R^1$, $R^2$, $R^3$, $R^4$, $R^5$, $R^6$, $R^7$, $R^8$, $R^9$, $R^{13}$ and $R^{14}$ are not simultaneously methyl group, and any pair of $R^1$ and $R^2$, $R^3$ and $R^4$, $R^5$ and $R^6$, $R^7$ and $R^8$ or $R^{13}$ and $R^{14}$ can form a ring with the silicon atom to which the respective pair is bonded, m is 0 or 1, and n is a positive integer.

10. A compound of formula (II-1)

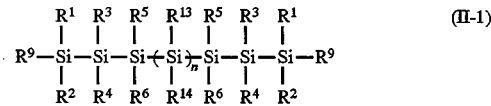

(II-1)

wherein $R^1$, $R^2$, $R^3$, $R^4$, $R^5$, $R^6$, $R^9$, $R^{10}$, $R^{11}$, $R^{12}$, $R^{13}$ and $R^{14}$ each, independently, represent hydrogen, alkyl, aryl, alkenyl, alkynyl, silyl or amino group, with the proviso that $R^1$, $R^2$, $R^3$, $R^4$, $R^5$, $R^6$, $R^9$, $R^{10}$, $R^{11}$, $R^{12}$, $R^{13}$ and $R^{14}$ are not simultaneously methyl groups, and any pair of $R^1$ and $R^2$, $R^3$ and $R^4$, $R^5$ and $R^6$, or $R^{13}$ and $R^{14}$ can form a ring with the silicon atom to which the respective pair is bonded and n is a positive integer.

11. A polysilane compound of formula (I)

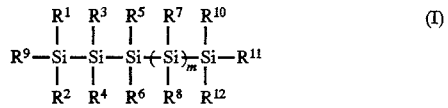

wherein $R^1$, $R^2$, $R^3$, $R^4$, $R^5$, $R^6$, $R^7$, $R^8$, $R^9$, $R^{10}$, $R^{11}$ and $R^{12}$ each, independently, represent hydrogen, alkyl, aryl, alkenyl, alkynyl, silyl or amino group, and any of the pairs of $R^1$ and $R^2$, $R^3$ and $R^4$, $R^5$ and $R^6$, $R^7$ and $R^8$, or $R^{10}$ and $R^{12}$ can form a ring with the silicon atom to which the respective pair is bonded; and m is 0 or 1; and which is the product obtained,by the method of claim 1.

12. A polysilane compound of formula (II)

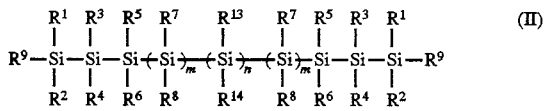

wherein $R^1$, $R^2$, $R^3$, $R^4$, $R^5$, $R^6$, $R^7$, $R^8$, $R^9$, $R^{13}$ and $R^{14}$ each, independently, represent hydrogen, alkyl, aryl, alkenyl, alkynyl, silyl or amino group, with the proviso that $R^1$, $R^2$, $R^3$, $R^4$, $R^5$, $R^6$, $R^7$, $R^8$, $R^{13}$ and $R^{14}$ are not simultaneously methyl groups and any of the pairs of $R^1$ and $R^2$, $R^3$ and $R^4$, $R^5$ and $R^6$, $R^7$ and $R^8$ or $R^{13}$ and $R^{14}$ can form a ring with the silicon atom to which the respective pair is bonded, m is 0 or 1 and n is a positive integer; and which is the product obtained by the method of claim 2.

13. A polysilane compound according to claim 11 wherein the small-ring polysilane of formula (III) is selected from the group consisting of hexapropylcyclotrisilane, hexa(2,2-dimethylpropyl)cyclotrisilane, hexa(1,1-dimethylethyl) cyclotrisilane, hexamesitylcyclotrisilane, octa (trimethylsilyl)cyclotetrasilane, octaethylcyclotetrasilane, octa(isopropyl)cyclotetrasilane, octaphenylcyclotetrasilane, 1,2,3,4-tetramethyl-1,2,3,4-tetraphenylsilane, 1,2,3,4-tetrabromo-1,2,3,4-tetraphenylcyclotetrasilane, 1,2,3,4-tetramethoxy-1,2,3,4-tetraphenylcyclotetrasilane, 1,2,3,4-tetraphenylcyclotetrasilane, 1,2,3,4-tetravinyl-1,2,3,4-tetraphenylcyclotetrasilane, 1,2,3,4-tetraethylcyclotetrasilane, and 1,2,3,4-tetraphenylcyclotetrasilane; the organolithium reagent of formula (IV) is selected from the group consisting of phenyldimethylsilyllithium, diphenylmethylsilyllithium, triphenylsilyllithium, trimethylsilyllithium, 4-(dimethylamino)phenyl(dimethyl)silyllithium, 4-(diethylamino)phenyl(dimethyl)silyllithium, diethylamino(dimethyl)silyllithium, butyllithium, phenyllithium, and methyllithium; and, in the silane of formula (V), $R^{10}$, $R^{11}$ and $R^{12}$ are each, independently, selected from the group consisting of methyl, ethyl, propyl, butyl, pentyl, hexyl, cyclohexyl, isobutyl, isopropyl, benzyl, phenyl, thienyl, pyridyl, naphthyl, furyl, ethenyl, propenyl, butenyl, pentenyl, hexenyl, cyclohexenyl, cyclopentenyl, ethynyl, propynyl, butynyl, pentynyl, hexynyl, trimethylsilyl, triethylsilyl, tripropylsilyl, tributylsilyl, tripentylsilyl, trihexylsilyl, triphenylsilyl, phenyldimethylsilyl, diphenylmethylsilyl, dimethylamino, and diethylamino; and any of these alkyl, aryl, alkenyl, alkynyl, and sibyl groups may have substituents selected from the group consisting of aryl, trifluoromethyl, nitro, cyano, alkoxy, acyl and halogen.

14. A polysilane compound according to claim 12 wherein the small-ring polysilane of formula (III) is selected from the group consisting of hexapropylcyclotrisilane, hexa (2,2-dimethylpropyl)cyclotrisilane, hexa(1,1-dimethylethyl) cyclotrisilane, hexamesitylcyclotrisilane, octa (trimethylsilyl)cyclotetrasilane, octaethylcyclotetrasilane, octa(isopropyl)cyclotetrasilane, octaphenylcyclotetrasilane, 1,2,3,4-tetramethyl-1,2,3,4-tetraphenylsilane, 1,2,3,4-tetrabromo-1,2,3,4-tetraphenylcyclotetrasilane, 1,2,3,4-tetramethoxy-1,2,3,4-tetraphenylcyclotetrasilane, 1,2,3,4-tetraphenylcyclotetrasilane, 1,2,3,4-tetravinyl-1,2,3,4-tetraphenylcyclotetrasilane, 1,2,3,4-tetraethylcyclotetrasilane, and 1,2,3,4-tetraphenylcyclotetrasilane; the organolithium reagent of formula (IV) is selected from the group consisting of phenyldimethylsilyllithium, diphenylmethylsilyllithium, triphenylsilyllithium, trimethylsilyllithium, 4-(dimethylamino)phenyl(dimethyl)silyllithium, 4-(diethylamino)phenyl(dimethyl)silyllithium, diethylamino(dimethyl)silyllithium, butyllithium, phenyllithium, and methyllithium; and in the silane of formula (VI) $R^{13}$ and $R^{14}$ are each independently, selected from the group consisting of methyl, ethyl, propyl, butyl, pentyl, hexyl, cyclohexyl, isobutyl, isopropyl, benzyl, phenyl, thienyl, pyridyl, naphthyl, furyl, ethenyl, propenyl, butenyl, pentenyl, hexenyl, cyclohexenyl, cyclopentenyl, ethynyl, propynyl, butynyl, pentynyl, hexynyl, trimethylsilyl, triethylsilyl, tripropylsilyl, tributylsilyl, tripentylsilyl, trihexylsilyl, triphenylsilyl, phenyldimethylsilyl, diphenylmethylsilyl, dimethylamino, and diethylamino; and any of these alkyl, aryl, alkenyl, alkynyl, and silyl groups may have substituents selected from the group consisting of aryl, trifluoromethyl, nitro, cyano, alkoxy, acyl and halogen.

15. A polysilane compound of formula (I-1),

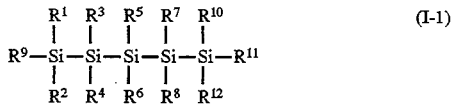

wherein $R^1$, $R^2$, $R^3$, $R^4$, $R^5$ and $R^6$ are propyl, 2,2-dimethylpropyl, 1,1-dimethylethyl or mesityl;

$R^9$ is phenyldimethylsilyl, diphenylmethylsilyl, triphenylsilyl, trimethylsilyl, 4-(dimethylamino)phenyl (dimethyl)silyl, 4-(diethylamino)phenyl(dimethyl) silyl, diethylamino(dimethyl)silyl, butyl, phenyl or methyl; and $R^{10}$, $R^{11}$ and $R^{12}$ are each, independently, selected from the group consisting of methyl, ethyl, propyl, butyl, pentyl, hexyl, cyclohexyl, isobutyl, isopropyl, benzyl, phenyl, thienyl, pyridyl, naphthyl, furyl, ethenyl, propenyl, butenyl, pentenyl, hexenyl, cyclohexenyl, cyclopentenyl, ethynyl, propynyl, butynyl, pentynyl, hexynyl, trimethylsilyl, triethylsilyl, tripropylsilyl, tributylsilyl, tripentylsilyl, trihexylsilyl, triphenylsilyl, phenyldimethylsilyl, diphenylmethylsilyl, dimethylamino, and diethylamino; and any of these alkyl, aryl, alkenyl, alkynyl, and silyl groups may have substituents selected from the group consisting of aryl, trifluoromethyl, nitro, cyano, alkoxy, acyl and halogen.

16. The polysilane compound of claim 7 wherein, in formula (I) $R^1$, $R^2$, $R^3$, $R^4$, $R^5$, $R^6$, $R^7$ and $R^8$ are trimethylsilyl, ethyl, isopropyl or phenyl; or $R^1$, $R^3$, $R^5$ and $R^7$ are hydrogen, methyl, or vinyl and $R^2$, $R^4$, $R^6$ and $R^8$ are ethyl or phenyl;

$R^9$ is phenyldimethylsilyl, diphenylmethylsilyl, triphenylsilyl, trimethylsilyl, 4-(dimethylamino)phenyl(dimethyl)silyl, 4-(diethylamino)phenyl(dimethyl)silyl, diethylamino(dimethyl)silyl, butyl, phenyl or methyl; and $R^{10}$, $R^{11}$ and $R^{12}$ are each, independently, selected from the group consisting of methyl, ethyl, propyl, butyl, pentyl, hexyl, cyclohexyl, isobutyl, isopropyl, benzyl, phenyl, thienyl, pyridyl, naphthyl, furyl, ethenyl, propenyl, butenyl, pentenyl, hexenyl, cyclohexenyl, cyclopentenyl, ethynyl, propynyl, butynyl, pentynyl, hexynyl, trimethylsilyl, triethylsilyl, tripropylsilyl, tributylsilyl, tripentylsilyl, trihexylsilyl, triphenylsilyl, phenyldimethylsilyl, diphenylmethylsilyl, dimethylamino, and diethylamino; and any of these alkyl, aryl, alkenyl, alkynyl, and silyl groups may have substituents selected from the group consisting of aryl, trifluoromethyl, nitro, cyano, alkoxy, acyl and halogen.

17. The polysilane compound of claim 9 wherein, in formula (II), when m is 0, $R^1$, $R^2$, $R^3$, $R^4$, $R^5$ and $R^6$ are propyl, 2,2-dimethylpropyl, 1,1-dimethylethyl or mesityl and, when m is 1, $R^1$, $R^2$, $R^3$, $R^4$, $R^5$, $R^6$, $R^7$ and $R^8$ are trimethylsilyl, ethyl, isopropyl or phenyl; or $R^1$, $R^3$, $R^5$ and $R^7$ are hydrogen, methyl, or vinyl, and $R^2$, $R^4$, $R^6$ and $R^8$ are ethyl or phenyl;

$R^9$ is phenyldimethylsilyl, diphenylmethylsilyl, triphenylsilyl, trimethylsilyl, 4-(dimethylamino)phenyl(dimethyl)silyl, 4-(diethylamino)phenyl(dimethyl)silyl, diethylamino(dimethyl)silyl, butyl, phenyl or methyl; and $R^{13}$ and $R^{14}$ are each, independently, selected from the group consisting of methyl, ethyl, propyl, butyl, pentyl, hexyl, cyclohexyl, isobutyl, isopropyl, benzyl, phenyl, thienyl, pyridyl, naphthyl, furyl, ethenyl, propenyl, butenyl, pentenyl, hexenyl, cyclohexenyl, cyclopentenyl, ethynyl, propynyl, butynyl, pentynyl, hexynyl, trimethylsilyl, triethylsilyl, tripropylsilyl, tributylsilyl, tripentylsilyl, trihexylsilyl, triphenylsilyl, phenyldimethylsilyl, diphenylmethylsilyl, dimethylamino, and diethylamino; and any of these alkyl, aryl, alkenyl, alkynyl, and silyl groups may have substituents selected from the group consisting of aryl, trifluoromethyl, nitro, cyano, alkoxy, acyl and halogen.

* * * * *